UNITED STATES PATENT OFFICE.

JOHN McFADYEN, OF GLASGOW, SCOTLAND, ASSIGNOR TO THE GLASGOW FISHCURING AND BIVALVE COMPANY, LIMITED, OF SAME PLACE.

CULINARY STOCK AND METHOD OF MAKING SAME.

SPECIFICATION forming part of Letters Patent No. 585,395, dated June 29, 1897.

Application filed December 22, 1896. Serial No. 616,678. (No specimens.) Patented in England January 25, 1894, No. 1,635.

*To all whom it may concern:*

Be it known that I, JOHN McFADYEN, railway-guard, of 70 Surrey Place, in the city of Glasgow, Scotland, have invented a new or Improved Culinary Stock, of which the following is a specification.

This invention has reference to a new or improved culinary "stock" suitable for the making of fish soups, sauces, and the like.

To prepare this new or improved stock, I take a quantity of cockles, mussels, clams, or any edible shell-fish of a similar character and boil or cook the same, preferably by steaming in a close-covered boiler or vessel, using only the smallest quantity of added water necessary to produce the steam required. After the shell-fish is sufficiently cooked I remove the shells, bruise or reduce the flesh to a pulp, and strain off all the extracted liquid from it. To this liquid extract I add the water used in cooking the shell-fish and the liquid discharged in the cooking operation. I then take a quantity of the seaweed known as "Irish moss" or "carrageen," or any seaweed having similar properties, which has been well bleached to remove color, and boil it along with the liquid obtained as above described, apportioning the quantity of Irish moss and timing the boiling operation to obtain a jelly of the desired consistence. Before boiling the moss and liquid together or during the boiling operation I add salt and any other flavoring condiment—such as peppercorns or other spice. The product of the boiled liquid and moss, which constitutes the culinary stock, is then strained while hot and stored in vessels, such as stoneware jars, or it may be filled into tins or cans to be hermetically sealed up.

Having now described the invention, what I claim, and desire to secure by Letters Patent, is—

1. The described process of preparing a culinary stock, consisting in cooking edible shell-fish together with a quantity of water sufficient to produce the steam required for the cooking; removing the shells and reducing the flesh to a pulp and straining off the extracted liquid from the flesh; adding to the extracted substance the liquid used in cooking; adding to the whole a quantity of seaweed, such as Irish moss or carrageen, and then boiling the same until a jelly is obtained of the desired consistence.

2. The culinary stock herein described the same consisting of the extracted substance from cooked edible shell-fish, the liquid in which the shell-fish is cooked, and a sufficient quantity of seaweed, such as Irish moss or carrageen, to convert the stock into a jelly of the desired consistence.

Signed at Glasgow, Scotland, this 4th day of December, 1896.

JOHN McFADYEN.

Witnesses:
JAMES W. NEILSON,
GEORGE WEBSTER.